United States Patent
Ilg et al.

(10) Patent No.: US 6,828,377 B2
(45) Date of Patent: Dec. 7, 2004

(54) METHOD OF MAKING A POLYMER FROM A POLYMER PRECURSOR COMPOSITION

(75) Inventors: Otto Ilg, Asheville, NC (US); Harry Hu, Greenville, SC (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/161,758

(22) Filed: Jun. 4, 2002

(65) Prior Publication Data

US 2002/0192414 A1 Dec. 19, 2002

Related U.S. Application Data

(60) Provisional application No. 60/296,381, filed on Jun. 6, 2001.

(51) Int. Cl.$^7$ .................................................. C08K 5/34
(52) U.S. Cl. ........................ 524/718; 524/99; 524/612; 523/348
(58) Field of Search ............................ 523/348; 524/99, 524/612, 718

(56) References Cited

U.S. PATENT DOCUMENTS

| | | |
|---|---|---|
| 3,287,324 A | 11/1966 | Sweeny |
| 3,671,542 A | 6/1972 | Kwolek |
| 4,522,774 A | 6/1985 | Donnelly et al. |
| 5,567,761 A * | 10/1996 | Song .......................... 524/523 |
| 5,851,238 A | 12/1998 | Gadoury et al. |
| 6,136,433 A | 10/2000 | McIntosh et al. |
| 6,150,496 A * | 11/2000 | Ilg et al. ...................... 528/332 |
| 6,372,816 B1 * | 4/2002 | Walz et al. .................. 523/116 |

FOREIGN PATENT DOCUMENTS

WO    WO 99/46323    9/1999

* cited by examiner

Primary Examiner—Kriellion A. Sanders
(74) Attorney, Agent, or Firm—Fernando A. Borrego

(57) ABSTRACT

A method of making a polymer is disclosed. The method includes the following steps: packaging a polymer precursor composition in a sealable container; transferring the polymer precursor composition from the sealable container to a reaction vessel; and polymerizing the polymer precursor composition. A method of making a thermoformable article from a pre-packaged polymer precursor composition is also disclosed. Further, a method of doing business, which includes the step of offering for sale a sealable container containing a polymer precursor composition, is disclosed. In addition, articles of manufacture are disclosed. One article includes a sealable container containing a polymer precursor composition.

7 Claims, No Drawings

METHOD OF MAKING A POLYMER FROM A POLYMER PRECURSOR COMPOSITION

TECHNICAL FIELD

The present invention is directed to a method of packaging a polymer precursor composition, and a method of making a polymer from the polymer precursor composition. The present invention is further directed to packaged polymer precursor compositions.

BACKGROUND OF THE INVENTION

Much effort has been directed at improving the light stability of polymers, such as polyamides. One method of improving the light stability of polymers is to incorporate one or more components into the polymer structure, wherein the one or more components comprise a light-stabilizing moiety. When present in the polymer chain of the resulting polymer, the light-stabilizing moiety provides enhanced light stability to the polymer. For example, nylon and nylon fibers formed by the polymerization of caprolactam in the presence of a hindered piperidine compound, such as 4-amino-2,2,6,6-tetramethylpiperidine (TAD), exhibit improved light stability due to the light-stabilizing TAD moiety as taught in U.S. Pat. Nos. 5,851,238; 6,136,433; and 6,150,496, all of which are assigned to BASF Corporation, Mt. Olive, N.J., the entirety of all of which is incorporated herein by reference.

Typically, once a combination of polymer-producing components is found to produce a desired polymer, the combination of polymer-producing components is used over and over. The individual components used to produce the desired polymer are acquired separately and mixed together and then subjected to a polymerization reaction. However, this conventional process has a number of shortcomings. First, there is the potential to waste a great deal of time using trial-and-error techniques trying to determine the proper ratio of individual components needed to produce a polymer having optimum properties. Second, the act of measuring individual components and mixing the components together at a reaction vessel increases the likelihood of operator error, which can lead to an improper weighing of any one of the individual components, an improper molar ratio of individual components, inconsistency of polymer composition from batch-to-batch, and less than desirable resulting polymer.

What is needed in the art is a method of reducing the potential for operator error in the production of a desired polymer. What is also needed in the art is a method of reducing the variability in the end product during the production of a desired polymer. What is further needed in the art is a convenient method of producing a desired polymer without having to resort to a timely trial-and-error procedure.

SUMMARY OF THE INVENTION

The present invention addresses some of the difficulties and problems discussed above by the discovery of a method of making a desired polymer, wherein a polymer precursor composition is pre-packaged such that an operator pours the polymer precursor composition into a reaction vessel without having to weigh out individual components. The method of the present invention may be applicable for producing any polymer, which is produced from two or more polymer-producing components.

Accordingly, the present invention is directed to a method of making a polymer, wherein the method comprises packaging a polymer precursor composition in a sealable container; transferring the polymer precursor composition from the sealable container to a reaction vessel; and polymerizing the polymer precursor composition. The method allows an operator to pour premeasured polymer-producing components into a reaction vessel for a batch process or a continuous process without having to weigh the individual components.

The present invention is also directed to a method of making a thermoformable article, wherein the method comprises transferring a polymer precursor composition from the sealable container to a reaction vessel; polymerizing the polymer precursor composition; and shaping the polymer.

The present invention is further directed to a method of doing business, wherein the method comprises the step of offering for sale a sealable container, which contains a polymer precursor composition.

The present invention is even further directed to an article of manufacture comprising a sealable container and a polymer precursor composition within the sealable container.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the invention discussed are contemplated as would normally occur to one ordinarily skilled in the art to which the invention pertains.

The present invention is directed to a method of making a polymer. The method of the present invention is suitable for making any polymer composed of at least two monomers or polymer-forming components. The method of making a polymer comprises the steps of packaging a polymer precursor composition in a sealable container; transferring the polymer precursor composition from the sealable container to a reaction vessel; and polymerizing the polymer precursor composition. Desirably, the polymer precursor composition comprises at least two monomers or polymer-forming components, which polymerize in the presence of an initiator.

As used herein, the term "reaction vessel" includes vessels for use in a batch process, as well as, vessels for use in a continuous process. For example, reaction vessels for use in a batch process include, but are not limited to, a sealable mixing tank. In addition, reaction vessels for use in a continuous process include, but are not limited to, an extruder, or a mixing unit leading to an extruder.

In one embodiment of the present invention, the method of making a polymer further comprises one or more of the following steps: adding a polymerization initiator to the reaction vessel; adding one or more chain regulators to the reaction vessel; heating the reaction vessel; and pressurizing the reaction vessel.

The present invention is also directed to a method of making a thermoformable article. The method of making a thermoformable article may be used to make any thermoformable article including, but not limited to, fibers, films, and molded articles. The method of making a thermoformable article comprises the steps of transferring a polymer precursor composition from a sealable container to a reaction vessel; polymerizing the polymer precursor composition to form a polymer; and shaping the polymer. Suitable shaping processes include, but are not limited to, extrusion, pultrusion, and batch molding. Desirably, the thermoformable article is a fiber or film. More desirably, the thermoformable article is a fiber.

The method of the present invention is particularly useful in the preparation of light-stabilized polyamides and thermoformable articles formed therefrom. Suitable light-stabilized polyamides include, but are not limited to, polyamides disclosed in U.S. Pat. Nos. 5,851,238; 6,136,433; and 6,150,496, all of which are assigned to BASF Corporation, Mt. Olive, N.J., and all of which are incorporated herein by reference. The polyamides, disclosed in U.S. Pat. Nos. 5,851,238, 6,136,433, and 6,150,496, are produced by polymerizing caprolactam in the presence of water, an optional carboxylic acid chain regulator, and a hindered piperidine derivative. By preparing a polymer precursor composition comprising, for example, a desired ratio of caprolactam and a hindered piperidine derivative, the polyamides of U.S. Pat. Nos. 5,851,238, 6,136,433, and 6,150,496 may be prepared according to the present invention.

In one embodiment of the present invention, light-stabilized polyamides and light-stabilized polyamide articles, including fibers, are made using a polymer precursor composition. In this embodiment, the method of making light-stabilized polyamides comprises the steps of packaging a polymer precursor composition in a sealable container, wherein the polymer precursor composition comprises caprolactam and a hindered piperidine derivative; transferring the polymer precursor composition from the sealable container to a reaction vessel; and polymerizing the polymer precursor composition to form a polyamide. In a further shaping step, light-stabilized polyamide fibers are made by extruding the polyamide to form fibers. Desirably, the polymer precursor composition comprises caprolactam and 4-amino-2,2,6,6-tetramethylpiperidine (TAD).

One advantage of the method of the present invention is the ability to measure a desired amount of each of the components of the polymer precursor composition in a controlled environment. Quality control measurements may be taken to accurately determine the composition of the polymer precursor mixture prior to packaging, as opposed to discovering an improper combination of components in a polymerization vessel. In-line sample testing and process control techniques may be used to check and adjust the composition of the polymer precursor mixture while producing large quantities of polymer precursor mixture prior to packaging. Further, desired combinations of polymer precursor components having a consistent composition may be available to the consumer so that the guesswork is removed from the method of making a superior polymer. For example, if it has been determined that a desired composition for making polymer X comprises 1 mole of Component A and 0.5 moles of Component B, a prepackaged polymer precursor composition may be prepared and made available to the consumer.

In one embodiment of the present invention, it has been determined that a desired composition for making light-stabilized polyamide comprises from about 0.08 to about 0.40 weight percent of 4-amino-2,2,6,6-tetramethylpiperidine (TAD) in caprolactam, based on the total weight of the caprolactam/TAD mixture. More desirably, a composition for making light-stabilized polyamide comprises from about 0.10 to about 0.30 weight percent of 4-amino-2,2,6,6-tetramethylpiperidine (TAD) in caprolactam, based on the total weight of the caprolactam/TAD mixture. Even more desirably, a composition for making light-stabilized polyamide comprises 0.15 weight percent of 4-amino-2,2,6,6-tetramethylpiperidine (TAD) in caprolactam, based on the total weight of the caprolactam/TAD mixture. Therefore, one desired polymer precursor composition of the present invention comprises caprolactam and TAD at a weight ratio of 1:0.0015 (i.e., 1 kg of caprolactam to 1.5 g of TAD).

It should be noted that the present invention is applicable for producing many polymers and polymer fibers using a pre-packaged polymer precursor composition. For example, in the preparation of polyamide and polyamide fibers, a suitable pre-packaged polymer precursor composition may comprise caprolactam in combination with one or more light stabilizing components. Suitable light stabilizing components include, but are not limited to, hindered amines, hindered phosphites, hindered phosphonites, and hindered phenols, and a combination thereof. Suitable hindered amines for use in the present invention include, but are not limited to, amines having the following structure

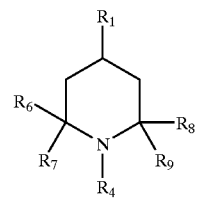

wherein $R_1$ represents $-NR_2R_3$;

$R_2$ and $R_3$ each independently represent hydrogen or an alkyl group containing from 1 to 7 carbon atoms;

$R_4$ represents hydrogen, an alkyl group containing from 1 to 20 carbon atoms, or $-OR_5$;

$R_5$ represents hydrogen or an alkyl group containing from 1 to 20 carbon atoms; and $R_6$, $R_7$, $R_8$ and $R_9$ each independently represent hydrogen or an alkyl group containing from 1 to 7 carbon atoms. Desirably, $R_4$ and $R_5$ each independently represent hydrogen or an alkyl group containing from 1 to 7 carbon atoms. Other suitable hindered amines include, but are not limited to, aromatic hindered amines sold under the trade designations NYLOSTAB™ S-EED from Clariant Corporation (Charlotte, N.C.); and TINUVIN® 765, TINUVIN® 770, and TINUVIN® 622 available from Ciba Specialty Chemicals Corporation (Tarrytown, N.Y.).

Suitable hindered phosphites and phosphonites for use in the present invention include, but are not limited to, hindered phosphites and hindered phosphonites sold under the trade designations IRGAFOS® 168, IRGAFOS® TNPP, and IRGAFOS® P-EPQ, all of which are available from Ciba Specialty Chemicals Corporation (Tarrytown, N.Y.).

Suitable hindered phenols for use in the present invention include, but are not limited to, hindered phenols sold under the trade designations IRGANOX® 245, IRGANOX® 1098, IRGANOX® 259, IRGANOX® 1135, IRGANOX® 1010, IRGANOX® 1222, IRGANOX® 1076, IRGANOX® 1330, IRGANOX® 1425, and IRGANOX® MD1024, all of which are available from Ciba Specialty Chemicals Corporation (Tarrytown, N.Y.).

Suitable blends, such as blends of hindered phenols and phosphites, for use in the present invention include, but are not limited to, compositions sold under the trade designations IRGANOX® B215, IRGANOX® B225, IRGANOX® B561, IRGANOX® B900, and IRGANOX® B1171, all of which are available from Ciba Specialty Chemicals Corporation (Tarrytown, N.Y.).

Further, in the preparation of polyamide and polyamide fibers, a suitable pre-packaged polymer precursor composition may comprise caprolactam in combination with one or more light stabilizing components, as well as, one or more chain regulators. Any chain regulator may be used in combination with the caprolactam and the one or more light stabilizing components as long as the chain regulator does not negatively impact the pre-packaged polymer precursor composition during storage and shipping of the product. By "negatively impact" it is meant that the chain regulator does not react with any of the pre-packaged polymer precursor components, and does not inhibit interaction of the pre-packaged polymer precursor components with one another. Suitable chain regulators, which may be pre-packaged with caprolactam and one or more light stabilizing components, include, but are not limited to, many of the chain regulators disclosed in U.S. Pat. Nos. 5,851,238; 6,136,433; and 6,150,496, all of which are assigned to BASF Corporation, Mt. Olive, N.J., and all of which are incorporated herein by reference.

Suitable chain regulators for use in the pre-packaged polymer precursor composition of the present invention include, but are not limited to, monocarboxylic acids, dicarboxylic acids, amines, diamines, and combinations thereof. Suitable monocarboxylic acids include, but are not limited to, acetic acid, propionic acid, and benzoic acid. Suitable dicarboxylic acids include, but are not limited to, $C_4$–$C_{10}$ alkane dicarboxylic acids, particularly adipic acid, azelaic acid, sebacic acid, decanedicarboxylic acid, and dodecanedioic acid; $C_5$–$C_8$ cycloalkane dicarboxylic acids, particularly cyclohexane-1,4-dicarboxylic acid; and benzoic dicarboxylic acids, particularly isophthalic acid, terephthalic acid, and naphthalene-2,6-dicarboxylic acid. Suitable amines include, but are not limited to, hexylamine, cyclohexylamine, octylamine, benzylamine, and 2-phenylethylamine. Suitable diamines include, but are not limited to, $C_2$–$C_{18}$ alkane diamines, particularly tetramethylene diamine, hexamethylene diamine, and dodecane diamine; $C_5$–$C_8$ cycloalkane diamines; and $C_6$–$C_{24}$ aryl diamines, particularly para-phenylene diamine, meta-phenylene diamine, meta-xylylene diamine, and para-xylylene diamine. Desirably, the chain regulator used in the pre-packaged polymer precursor composition of the present invention comprises one or more dicarboxylic acids or one or more diamines.

The chain regulator may be present in the pre-packaged polymer precursor composition of the present invention in an amount ranging from 0 to about 50 weight percent, based on the total weight of the polymer precursor composition mixture. Desirably, the one or more chain regulators are used in an amount ranging from about 0.001 to about 5.0 weight percent, based on the total weight of the polymer precursor composition mixture. More desirably, the one or more chain regulators are used in an amount ranging from about 0.01 to about 1.0 weight percent, based on the total weight of the polymer precursor composition mixture.

The pre-packaged polymer precursor compositions of the present invention may be packaged in a variety of sealable containers. As used herein, the term "sealable container" refers to a single-use or multi-use container, wherein the single-use container is opened and all of the pre-packaged polymer precursor composition is emptied from the container, while the multi-use container is opened, at least a portion of the pre-packaged polymer precursor composition is emptied from the container, and the container is closed or resealed. Suitable containers include, but are not limited to, metal containers, plastic containers, paper containers, or combinations thereof. The size of the sealable container may vary as desired. The sealable container may range in size from as small as a one-pound container to as large as a tank on a truck or a rail car. Desirably, the sealable container is a plastic-lined paper container. More desirably, the sealable container is a polyethylene-lined paper bag capable of containing 55 pounds (25 kg) of pre-packaged polymer precursor composition.

The pre-packaged polymer precursor composition of the present invention may be used in any conventional polymerization method. The pre-packaged polymer precursor composition of the present invention eliminates the need for an operator to weigh and then combine two or more polymer-forming components during the polymerization process. Instead, an operator transfers a desired amount of the pre-packaged polymer precursor composition to a reaction vessel, and then combines one or more additional materials with the pre-packaged polymer precursor composition. Additional materials include, but are not limited to, components such as polymerization initiators and chain regulators. In the case of polyamides, a pre-packaged polymer precursor composition comprising caprolactam and a hindered amine may be transferred from a sealable container to a reaction vessel, and then combined with additional materials including water (i.e., initiator) and an optional chain regulator, such as a carboxylic acid. See U.S. Pat. Nos. 5,851,238; 6,136,433; and 6,150,496 for a complete description of polymerization methods for forming polyamides.

The present invention is further directed to a method of doing business, wherein the method comprises the step of offering for sale a sealable container containing a polymer precursor composition comprising two or more polymer-forming components. The method of doing business may include one or more additional steps such as determining a desired ratio of two or more polymer-forming components; preparing a polymer precursor composition comprising two or more polymer-forming components; preparing a polymer precursor composition comprising two or more polymer-forming components according to a customer's specifications; packaging the polymer precursor composition in a sealable container; advertising the availability of specialty polymer precursor compositions; taking orders for specialty polymer precursor compositions in person, over the phone, or over the Internet; selling the polymer precursor composition in a sealable container; shipping the sealable container containing a polymer precursor composition; and delivering the sealable container containing a polymer precursor composition to a customer.

In one embodiment of the present invention, the method of doing business comprises the step of offering for sale a sealable container containing a polymer precursor composition comprising two or more polyamide-forming components. Desirably, the method of doing business comprises the step of offering for sale a sealable container containing a polymer precursor composition comprising caprolactam and a light-stabilizing component. More desirably, the method of doing business comprises the step of offering for sale a sealable container containing a polymer precursor composition comprising caprolactam and 4-amino-2,2,6,6-tetramethylpiperidine (TAD). Even more desirably, the method of doing business comprises the step of offering for sale a sealable container containing a polymer precursor composition comprising from about 0.08 to about 0.40 weight percent of 4-amino-2,2,6,6-tetramethylpiperidine (TAD) in caprolactam, based on the total weight of the caprolactam/TAD mixture. Even more desirably, the method of doing business comprises the step of offering for sale a sealable container containing a polymer precursor composition comprising from about 0.10 to about 0.30 weight percent of 4-amino-2,2,6,6-tetramethylpiperidine (TAD) in caprolactam, based on the total weight of the caprolactam/TAD mixture. Even more desirably, the method of doing business comprises the step of offering for sale a sealable container containing a polymer precursor composition comprising 0.15 weight percent of 4-amino-2,2,6,6-tetramethylpiperidine (TAD) in caprolactam, based on the total weight of the caprolactam/TAD mixture.

The present invention is even further directed to an article of manufacture comprising a sealable container containing a polymer precursor composition comprising two or more polymer-forming components. The sealable container may be any container capable of storing the polymer precursor composition. Suitable containers include containers as described above.

In one embodiment of the present invention, the article of manufacture comprises a sealable container containing a polymer precursor composition comprising two or more polyamide-forming components. Desirably, the article of manufacture comprises a sealable container containing a polymer precursor composition comprising caprolactam and a light-stabilizing component. More desirably, the article of manufacture comprises a sealable container containing a polymer precursor composition comprising caprolactam and 4-amino-2,2,6,6-tetramethylpiperidine (TAD). Even more desirably, the article of manufacture comprises a sealable container containing a polymer precursor composition comprising from about 0.08 to about 0.40 weight percent of 4-amino-2,2,6,6-tetramethylpiperidine (TAD) in caprolactam, based on the total weight of the caprolactam/TAD mixture. Even more desirably, the article of manufacture comprises a sealable container containing a polymer precursor composition comprising from about 0.10 to about 0.30 weight percent of 4-amino-2,2,6,6-tetramethylpiperidine (TAD) in caprolactam, based on the total weight of the caprolactam/TAD mixture. Even more desirably, the article of manufacture comprises a sealable container containing a polymer precursor composition comprising 0.15 weight percent of 4-amino-2,2,6,6-tetramethylpiperidine (TAD) in caprolactam, based on the total weight of the caprolactam/TAD mixture.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following test methods were used to determine physical and chemical properties of the polymer articles produced in the examples that follow.

Test For Measuring End Group Content

The amino end group content was determined by dissolving about 2.0 grams of a polymer in about 60 cc of a phenol-methanol mixture (68:32 wt %) at 60° C. The solution was then titrated with about 0.02 N HCl at about 25° C. by a potentiometric method, wherein the endpoint was determined by a steep potential increase.

The carboxylic end group content was determined by dissolving about 0.30 grams of a polymer in about 40 cc of a mixture of benzyl alcohol at 180° C. The solution was then titrated with about 0.03 N t-butyl ammonium hydroxide at about 80° C. to about 100° C. by a potentiometric method, wherein the endpoint was determined by a steep potential increase.

The AATCC 16E Test Method For Lightfastness

The procedure used to conduct the AATCC test method 16E is described herein. Swatches of fabric having dimensions of 2.75 in (6.99 cm)×4.70 in (11.94 cm) were cut from a woven fabric with the longest dimension of the fabric swatch being parallel to the machine direction of the fabric. The fabric samples were secured in a sample holder having front and back covers to produce a test specimen. The front cover of the sample holder had an opening so as to produce a fabric exposure area of 1.2 in (3.05 cm)×1.2 in (3.05 cm).

The test specimen was exposed to UV light at 420 nm from a water-cooled xenon-arc machine, an Atlas Ci35 Xenon-Arc WEATHER-O-METER®. The black panel temperature was set at 63° C., the dry bulb temperature was set at 43° C., and the humidity was set at 30%. The test specimen was exposed to a total of 2125 kJ of exposure in five 425 kJ increments.

Strength Retention Test

The strength retention test used to determine yarn strength after exposure to ultraviolet (UV) light is described herein. Fabric samples were exposed to UV light as described in the AATCC 16E Test Method For Lightfastness described above. The strength of yarn raveled from the fabric prior to exposure, as well as, yarn raveled from the fabric after exposure to UV light was measured using an INSTRON™ machine model 4502. The strength retention was determined as shown below:

$$\text{Strength Retention (\%)} = \frac{\text{(Yarn Strength After UV Exposure)}}{\text{(Yarn Strength Prior to UV Exposure)}} \times 100$$

Example 1

Preparation of a Packaged Nylon Precursor Composition

Into a 100 gallon stainless steel mixing vessel was added 300 kg of caprolactam and 450 g of 4-amino-2,2,6,6-tetramethylpiperidine (TAD). After mixing, a caprolactam/TAD mixture containing 0.15 wt % 4-amino-2,2,6,6-tetramethylpiperidine (TAD) was distributed into 55-gallon drums lined with a polyethylene film. The container was sealed.

Example 2

Preparation of Nylon Pellets Using a Prepackaged Precursor Composition

The sealed container of Example 1 was opened. To 75 kg of the fiber precursor composition was added 1800 g of water and 135 g of propionic acid. The resulting mixture was charged into a 250-liter autoclave. The mixture in the autoclave was heated to 270° C. in one hour while the pressure was increased to 60 psi (3102 mm Hg). After holding the mixture at 60 psi for 30 minutes, the pressure was slowly released. To accelerate polymerization, the system was placed under a vacuum of 400 mm Hg for 75 minutes.

The polymer was then extruded under a positive nitrogen pressure and cut into chips. The chips were washed with hot water (90° C.) and dried in a tumble dryer. The relative viscosity measured 2.71. The amino group content measured 42 meq/kg, and the carboxylic end group content measured 45 meq/kg.

Example 3

Preparation of Nylon Pellets Using a Prepackaged Precursor Composition

The sealed container of Example 1 was opened. To 75 kg of the fiber precursor composition was added 1800 g of water and 240 g of adipic acid. The resulting mixture was charged into a 250-liter autoclave. The mixture in the autoclave was heated to 270° C. in one hour while the pressure was increased to 60 psi (3102 mm Hg). After holding the mixture at 60 psi for 30 minutes, the pressure was slowly released. To accelerate polymerization, the system was placed under a vacuum of 500 mm Hg for 45 minutes.

The polymer was then extruded under a positive nitrogen pressure and cut into chips. The chips were washed with hot water (90° C.) and dried in a tumble dryer. The relative viscosity measured 2.67. The amino group content measured 37 meq/kg, and the carboxylic end group content measured 70 meq/kg.

Example 4

Preparation of Solution-Dyed Nylon Fibers Using Polymers Made with a Prepackaged Fiber Precursor Composition Samples of nylon-6 polymer from Examples 2 and 3, as well as, commercially available nylon-6 polymer (ULTRAMID B nylon-6 available from BASF corporation of Mount Olive, N.J.) were extruded using a small-scale extruder at 260–265° C. Opal Gray color concentrate was mixed with the nylon-6 polymer material, and fed to a spinning machine through volumetric feeders. The extruded filaments were cooled and solidified by a stream of quench air at 15° C. After the application of a spin finish, the yarns were drawn at a draw ratio of 3.3 and textured in a texture jet at 215° C. The yarns were taken off at a draw roll speed of about 2350 m/min. The final yarns formed from Examples 2 and 3 polymer samples and the ULTRAMID B nylon-6 polymer had a yarn construction of 1288 denier/58 filaments.

Example 5

Strength Retention Testing of Nylon Fibers Using an AATCC 16E Test Method

Knitted fabric samples were produced by knitting fabrics using the three types of yarns produced in Example 4. Fabrics were knitted on a knitting machine, Model 6CK, manufactured by L-R Machine Sales, Inc. (Chickamauga, Ga.) using the following settings: 6 inch-diameter, and 90 needles. The strength retention of yarn samples removed from the fabric samples were measured after exposure to UV light according to AATCC 16E Test Method described above.

The TAD-containing polymer fibers were found to have superior strength retention properties when compared to fibers produced from commercially available nylon-6 polymer (ULTRAMID B nylon-6). The TAD-containing polymer fibers retained more than 85% of their strength after 2125 KJ of exposure. However, the fibers produced from ULTRAMID B nylon-6 only retained about 40% of their strength after 2125 KJ of exposure.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a polymer, wherein the method comprises:

packaging a polymer precursor composition in a sealable container, wherein the polymer precursor composition comprises caprolactam and a light-stabilizing compound;

transferring the polymer precursor composition from the sealable container to a reaction vessel; and adding a polymerization initiator to said vessel and polymerizing the polymer precursor composition.

2. The method of claim 1, wherein the light-stabilizing compound comprises 4-amino-2,2,6,6-tetramethylpiperidine.

3. The method of claim 1, wherein the polymer precursor composition comprises a mixture of 1 part by weight of caprolactam and 0.0015 parts by weight of 4-amino-2,2,6,6-tetramethylpiperidine.

4. The method of claim 1, further comprising adding one or more additional materials to the reaction vessel.

5. The method of claim 4, wherein the one or more additional materials comprise a chain regulator.

6. A method of making a thermoformable article comprising shaping the polymer made from the method of claim 1.

7. A method of making a fiber comprising extruding the polymer made from the method of claim 1.

* * * * *